United States Patent [19]

Noda

[11] Patent Number: 5,457,740
[45] Date of Patent: Oct. 10, 1995

[54] CROSS POINT MIXER FOR A TELEPHONE SET

[75] Inventor: Mitsuhiko Noda, Kyoto, Japan

[73] Assignee: Rohm Co., Ltd., Kyoto, Japan

[21] Appl. No.: 980,257

[22] Filed: Nov. 23, 1992

[30] Foreign Application Priority Data

Nov. 27, 1991 [JP] Japan .................................. 3-312350

[51] Int. Cl.[6] .................................................. H04M 1/26
[52] U.S. Cl. ........................ 379/306; 379/335; 379/368; 379/291; 379/292
[58] Field of Search ............................ 381/119; 379/32, 379/33, 61, 165, 179, 267, 279, 306, 307, 308, 335, 340, 370, 373, 375, 374, 368, 387, 413, 418, 94, 291, 292

[56] References Cited

U.S. PATENT DOCUMENTS

| | | | |
|---|---|---|---|
| 3,859,471 | 1/1975 | Danielsen et al. | 379/306 |
| 3,872,439 | 3/1975 | Salam | 379/306 |
| 4,327,255 | 4/1982 | Suszylo | 379/368 |
| 4,635,250 | 1/1087 | Georgiou | 379/306 |
| 4,635,288 | 1/1987 | Stadius | 381/119 |
| 5,081,668 | 1/1992 | Ito | 379/61 |
| 5,113,431 | 5/1992 | Horn | 379/203 |
| 5,220,597 | 6/1993 | Horiuchi | 379/368 |

FOREIGN PATENT DOCUMENTS 2916130  10/1979  Germany ..................... 379/306

Primary Examiner—Jeffery A. Hofsass
Assistant Examiner—Scott Wolinsky
Attorney, Agent, or Firm—Oliff & Berridge

[57] ABSTRACT

Disclosed is a cross point mixer including a cross point switch and a mixing circuit provided on the output side. The cross point switch includes n×m switches arranged in a matrix manner. Each of the switches corresponds to one of a plurality of n input terminals receiving signals, and corresponds to one of a plurality of m output terminals outputting signals. When on, each of the switches forms a signal transmission path which connects a corresponding input terminal with a corresponding output terminal. The mixing circuit provided on the output side receives signals from the n switches correspondingly associated with the output terminal, and subjects the signals to mixing for output to the output terminal.

18 Claims, 8 Drawing Sheets

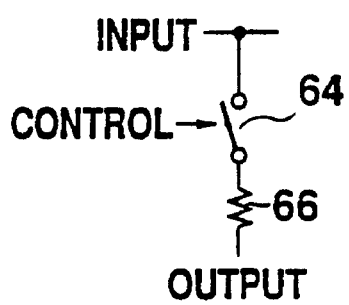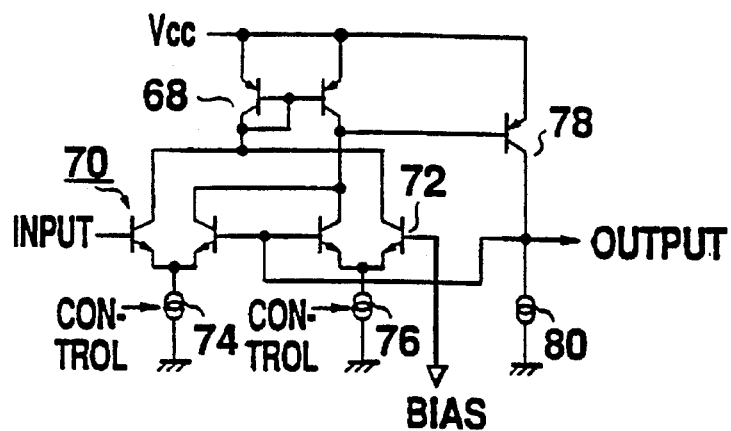
Fig. 7A  Fig. 7B
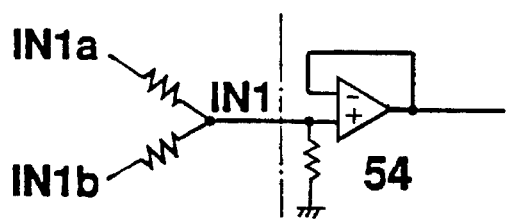
Fig. 8

CROSS POINT MIXER FOR A TELEPHONE SET

BACKGROUND OF THE INVENTION

1. Field of the Invention

The present invention generally relates to an improvement of a signal switching circuit for use in a telephone set or the like, and more particularly is directed to a cross point mixer adapted to be loaded with the telephone set having a multiplicity of functions.

2. Description of the Related Arts

Recently, telephone sets provided with a multiplicity of functions have been on the market. Such telephone sets include complicated internal wiring due to the necessity of ensuring a proper action of the functions. This inconvenience is serious in, for example, mixing of voice signals.

SUMMARY OF THE INVENTION

The present invention was conceived in view of overcoming the above problem, and aims to reduce and simplify signal transmission paths so as to lessen the number of control wiring, control terminals and components to be used, thereby realizing an increased reliability, space saving and cost reduction as well as an improved design freedom and ability to deal with changes in specifications.

In order to achieve such objects, a cross point mixer of the present invention comprises a plurality of switches arranged in a matrix manner, and a mixing means provided on the output side. The switch matrix serves as means of switching signal transmission paths by arbitrarily connecting a plurality of input terminals with a plurality of output terminals, while the mixing means on the output side is disposed in front of the output terminals for mixing outputs of the switches.

Firstly, description will be made of the switches arranged in a matrix manner (referred to as a cross point switch hereinafter).

It will be appreciated that in a device incorporating a plurality of circuits, like the telephone set, the cross point switch may be used for switching the signal transmission paths in the case of selectively outputting signals to be input from the plurality of circuits into optional circuits. The configuration of the cross point switch, for example, as shown in FIG. 1 enables analog switches 10 to be controllably opened and closed by way of address inputs A to D. This cross point switch comprises sixteen (4×4=16) analog switches designated at 0 to 15 in the figure and arranged in a matrix manner. The analog switches 10 are arranged to make or break the connection between any one of four (4) signal input terminals X0 to X3 and any one of four (4) signal output terminals Y0 to Y3. The address inputs A to D given in 4-digit hexadecimal numbers are converted to 16-bit binary numbers with the aid of a 4–16 line decoder 12 in response to a strobe signal STROBE. 6-bit data derived from the decoder 12 are latched by a 16-bit latch circuit 14 in compliance with a latch signal DATAIN. The analog switches 10 are opened or closed in accordance with the output of the latch circuit 14. In this cross point switch, therefore, the opening and closing of the analog switches 10 are controlled by the address inputs A to D.

It is, however, substantially impossible for the thus configured cross point switch to accomplish the object of the present invention. More concretely, it is difficult to apply to devices requiring voice mixing like telephone sets and to realize a proper signal transmission within the telephone sets. The following is a description of such inconvenience, provided by way of example.

First, assuming that two signals to be mixed are input into signal input terminals $X_0$ and $X_3$, respectively, an analog switch 10 designated at 0 in FIG. 1 must be turned on to connect the signal input terminal $X_0$ with a signal output terminal $Y_0$. On the other hand, an analog switch 10 designated at 3 in the figure is to be turned on to connect the signal input terminal $X_3$ with the signal output terminal $Y_0$. If the two analog switches 10 are simultaneously turned on, the signal input terminals $X_0$ and $X_3$ are connected to the signal output terminal $Y_0$ while permitting a signal transmission from the signal input terminal $X_0$ to the signal input terminal $X_3$ via the output terminal $Y_0$ (so called round-back crosstalk). It is therefore impossible for the two signals input through the signal input terminals $X_0$ and $X_3$, respectively, to be mixed together and to be output through the signal output terminal $Y_0$.

While on the contrary, the mixing means provided on the output side which is a second feature of the present invention has a basic configuration as diagrammatically illustrated in FIG. 2. As is apparent from this figure, in the case where a plurality of inputs (for example, inputs 1 and 2) are connected to an input terminal of an operational amplifier 20 through a resistor 16 and a switch 22, and through a resistor 18 and a switch 24, respectively, the signal which the operational amplifier 20 receives can be selectively changed over from the input 1 or from the input 2. Through the appropriate execution of this changeover, the signal from the input 1 and the signal from the input 2 can be mixed together and output from the operational amplifier 20. Accordingly, this mixing circuit ensures an easy mixing through the control of the opening and closing of the switches 22 and 24.

A circuit depicted in FIG. 3 represents an example in which the circuit in FIG. 2 is used for mixing an inter circuit message and a time message. In this case, the inputs 1 and 2 in FIG. 2 receive an inter circuit message ICM and a time message (or a time stamp) derived from a voice synthesizer, respectively. Furthermore, the selective opening and closing of the switches 22 and 24 allows the operational amplifier 20 to output a signal which is obtained by mixing the inter circuit message ICM and the time message. The signal output from the operational amplifier 20 may be supplied to, for example, a cassette tape recorder so as to record the mixed signal onto a cassette tape.

Additionally, the mixing circuit shown in FIG. 2 may be used to realize a three-party communication in the cordless telephone set and the like. FIG. 4 illustrates a configuration of the cordless telephone set capable of effecting the three-party communication. In this figure, there are employed three FIG. 2 circuits designated by reference numerals 32, 34 and 36, respectively. Among these mixing circuits, the circuit 32 acts to mix a DETOUT output of an RF (radio frequency) module 30 and a MIC output of a handset 28 for the supply to a MICIN terminal of a speech circuit 26. The mixing circuit 34 aims to perform mixing of the DETOUT output of the RF module 30 and a ROUT output of the speech circuit 26 for the supply to an SP input terminal of the handset 28. The mixing circuit 36 is intended to mix the ROUT output of the speech circuit 26 and a MIC output of the handset 28 for the supply to a MODIN input terminal of the RF module 30.

The circuits to be connected through the mixing circuits 32, 34 and 36 in this manner have the following functions.

Firstly, the speech circuit 26 being connected to a telephone line receives a signal from the telephone line and outputs it through its ROUT terminal. Moreover, the speech circuit 26 transmits a signal which has been received through its MICIN terminal to the telephone line.

Secondly, the handset 28 is adapted to be held by a main set's user. The handset 28 converts a voice produced by the main set's user into an electric signal and outputs it through its MIC terminal. The hand set 28 converts a signal which has been received through its SP terminal into sound for the output.

Thirdly, the RF module 30 performs a wireless connection between the main set and its branch. The RF module 30 demodulates an RF signal which has been received from the branch and outputs it through its DETOUT terminal while modulating a signal which has been received through the MODIN terminal for the transmission to the branch.

In consequence, the execution of the mixing by means of the mixing circuits 32, 34 and 36 enables three parties or the users of the telephone line (an external telephone set), main set and branch to communicate with one another.

FIG. 5 depicts an exemplary configuration of a cordless answering telephone set, in particular, of its main set. A possible cordless answering telephone set may consist of the main set and a couple of branches. The main set shown in this figure includes a speech circuit 26 for the connection with the telephone line. Moreover, the main set illustrated in this figure includes a couple of RF modules 30-1 and 30-2 for the connection with the two branches, respectively. The main set depicted in this figure further includes a voice recording/playback circuit 38 which records a speaking voice or a variety of messages as data and replays them; a tape recording/playback circuit 40 which records a speaking voice and a variety of messages onto a cassette tape and replays them; a voice synthesizer 42 which outputs a synthesized voice such as a time stamp; a melody producing circuit 44 which produces a melody during hold; and a CPU 46 which controls the above functions.

For the connection of the circuits, this telephone set comprises a mixing network 48 including a multiplicity of FIG. 2 mixing circuits so as to form the necessary signal transmission paths.

In order to record a telephone voice through the telephone line onto a cassette tape, for example, there must be established a path connecting between the output of the speech circuit 26 and the input of the tape recording/playback circuit 40, which is realized in this mixing network 48 by virtue of the mixing circuits. Additionally, for the purpose of transmitting a synthesized voice to the telephone line while connecting a branch to the telephone line, it is necessary to design the mixing network 48 in such a manner that a detection output of the RF module 30-1 or 30-2 and a voice output of the voice synthesizer 42 are subjected to mixing for the connection to an input of the speech circuit 26. The control of the signal transmission path in the mixing network 48 can be carried out by selectively opening and closing the switches with the aid of the CPU 46.

As is clear from the above description, the cross point switch is independently incapable of performing mixing due to the occurrence of round-back crosstalk. While on the contrary, the mixing network as shown in FIG. 5 disadvantageously requires a large number of components and presents a complicated circuit configuration because there must be provided control wirings to transmit control signals for opening and closing the analog switches and the control terminals corresponding to the number of analog switches.

The present invention is intended to solve such drawback and achieve the object described hereinbefore by a combination of the cross point switch and the mixing circuit. This combination (referred to as a cross point mixer) comprises:

a) cross point switches including n×m switches arranged in a matrix manner;

each of the switches corresponding to any one of a plurality of n input terminals which are receiving signals, respectively, each of the switches corresponding to any one of plurality of m output terminals which are outputting signals, respectively, each of the switches forming a signal transmission path connecting the corresponding input terminal with the corresponding output terminal when switched on, and b) a mixing means provided on the output side, for receiving signals from n switches arranged correspondingly to the same output terminal and mixing them for output to the output terminal.

In the cross point mixer of the present invention, connections between n input terminals and m output terminals are set by means of switches arranged in a matrix manner. A signal which has entered an input terminal is supplied to a mixing means provided on the output side by way of one of the switches. The mixing means on the output side serves to mix input signals for supply to the output terminals. At that time, the mixing means on the output side presents a directionality, and hence the signal transmission paths are free from a bi-directionality. As a result, even though signals input through a plurality of input terminals are assigned to the same output terminal, there arises no round-back crosstalk. In addition, the signal transmission paths may decrease in number and have a simple configuration which can be represented as an n×m matrix.

Furthermore, the provision of a means for variably setting the connection between the input terminals and the mixing means on the output side by selectively opening and closing the switches makes it possible to change a setting of the circuit by merely changing the action of this means, which results in easier coping with the change in specifications and improvement of freedom of design. For example, through the alteration in the software of the CPU, as the means for variably setting the connection, the setting of the circuit can be altered.

Moreover, providing this means includes a means which subjects the conversion of serially input control data to parallel data conversion, so that the number of input terminals leading to a control means becomes less than the number of switches, thus reducing the amount of wiring, which contributes to an improved reliability, space saving, and cost reduction.

The cross point mixer in accordance with the present invention has a variety of applications as stated hereinbelow.

The first is an application to setting of connections between the telephone set and its optional equipment.

The telephone system associated with this application comprises:

a) optional equipment to be connected to a main set by wires or wirelessly; and b) the main set including a cross point mixer of the present invention for setting the connections with respect to the optional equipment.

The second is an application to setting connections between a speech circuit and the other circuits in the telephone set. The telephone set associated with this application comprises:

a) a speech circuit connected to a telephone line;

b) a plurality of circuits which receive and transmit signals from and to the speech circuit;

c) a cross point mixer of the present invention for setting connections between the speech circuit and the plurality of circuits.

The third is an application to setting connections between an RF circuit and the other circuits in a branch. The telephone set associated with this application comprises:

a) a main set which receives and transmits a radio signal;

b) a branch including;

b1) an RF circuit which receives and transmits a radio signal from and to the main set;

b2) a plurality of circuits which receive and transmit signals from and to the RF circuit; and b3) a cross point mixer of the present invention for setting connections between the RF circuit and the plurality of circuits in the branch.

In these applications, at least one of the connections between the main set and the optional equipment, between the speech circuit and the other circuits in the main set, and between the RF circuit and the other circuits in the branch is set by the cross point mixer of the present invention. From this it follows that the three-party communication, call between branches, voice output in which the synthesized voice is mixed with the telephone user's voice, and the like can be realized by a simple circuit configuration.

BRIEF DESCRIPTION OF THE DRAWINGS

FIGS. 7A and 7B are circuit diagrams showing configurations of switches in this embodiment, and illustrate an exemplary configuration including an analog switch and a resistor, and an exemplary differential switch, respectively;

FIG. 8 is a view illustrating mixing by means of an input buffer;

DESCRIPTION OF THE PREFERRED EMBODIMENTS

Figure 1:
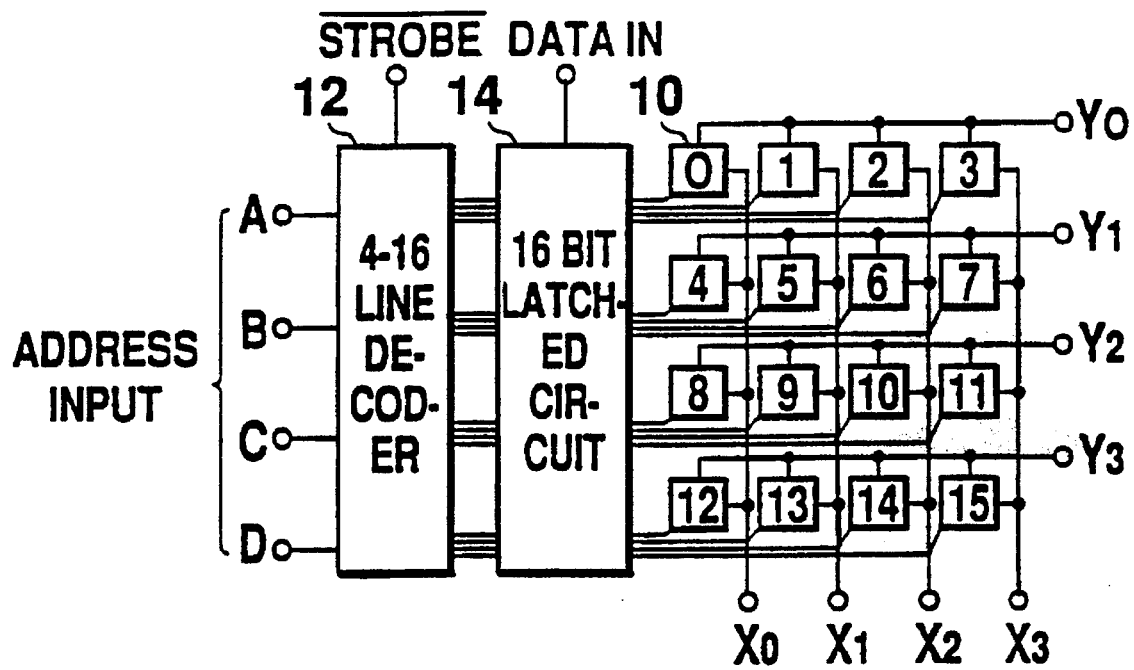
FIG. 1 is a block diagram showing a basic configuration of a cross point switch.
Figure 2:
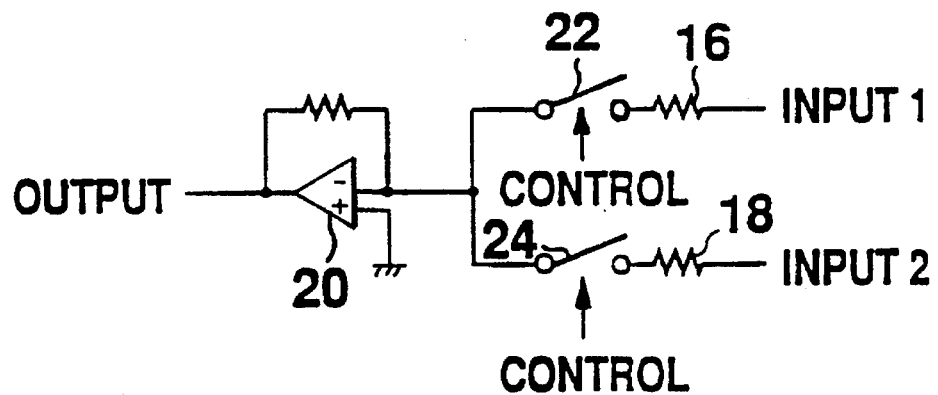
FIG. 2 shows a configuration of a mixing circuit including an analog switch and an operational amplifier.
Figure 3:
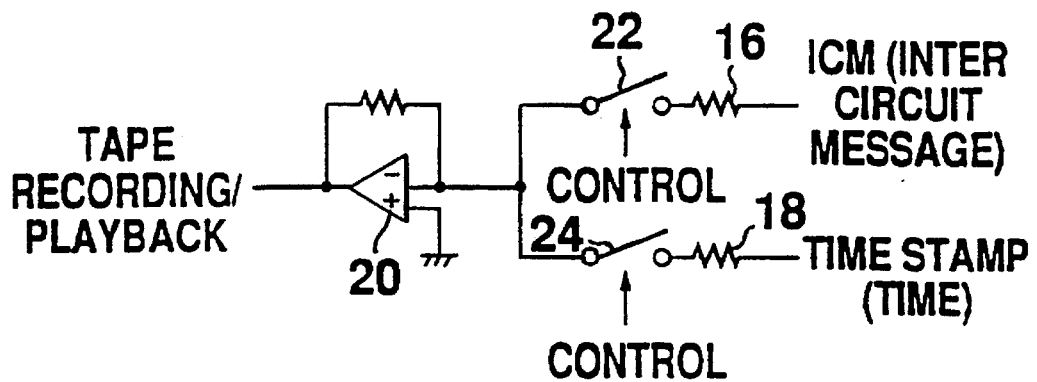
FIG. 3 shows a configuration of a mixing circuit adapted to perform mixing of an inter circuit message and a time message whose voice is synthesized.
Figure 4:
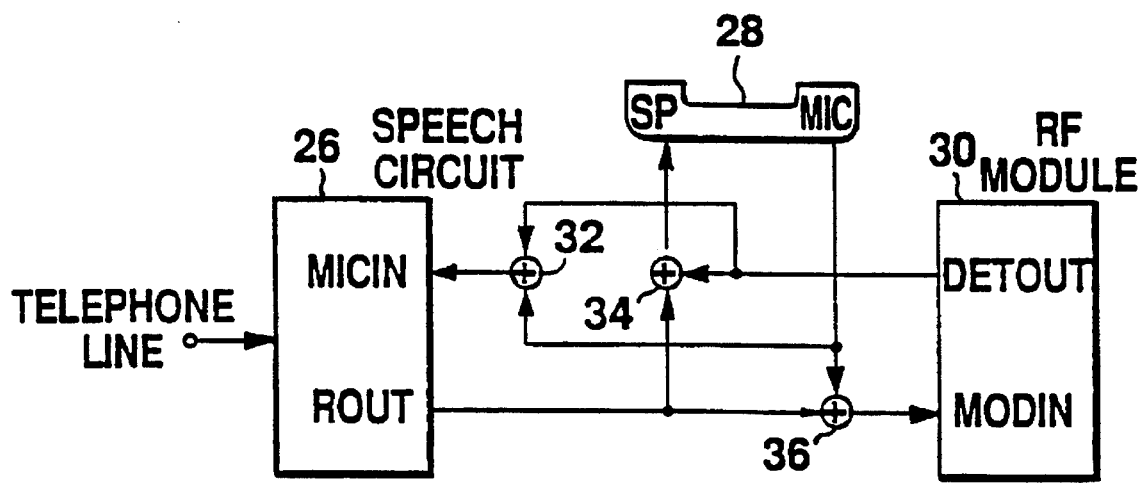
FIG. 4 is a block diagram showing, by way of example, a configuration of a cordless telephone set with three-party communication function.
Figure 5:
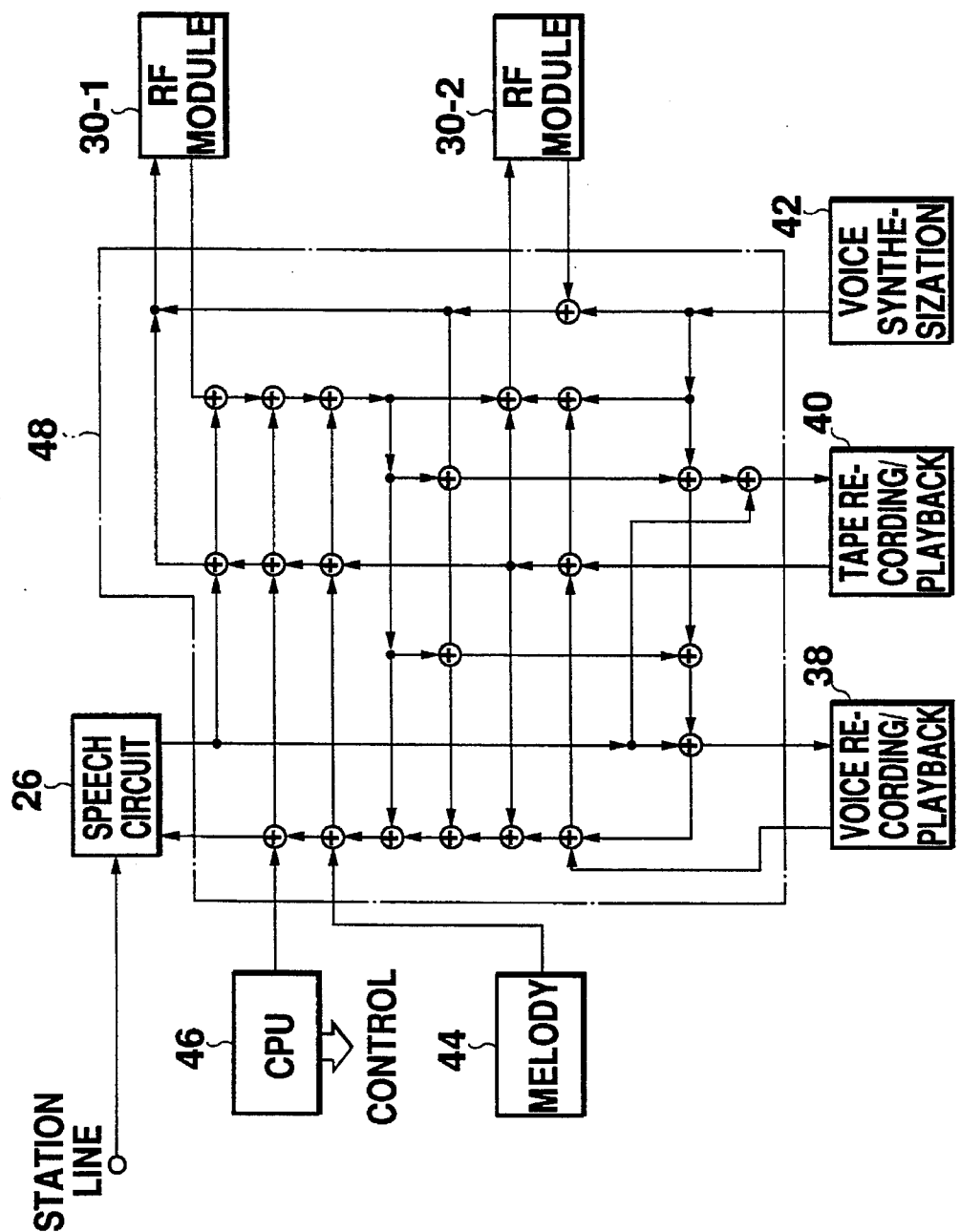
FIG. 5 is a block diagram showing, by way of example, a configuration of a cordless answering telephone set.

A presently preferred embodiment of the present invention will now be described with reference to the accompanying drawings. It is to be noted that identical reference numerals are imparted to the same elements as those of configurations in FIGS. 1 to 5 which have been conceived for deriving therefrom a configuration according to the present invention, and the description thereof is omitted.

Figure 6:
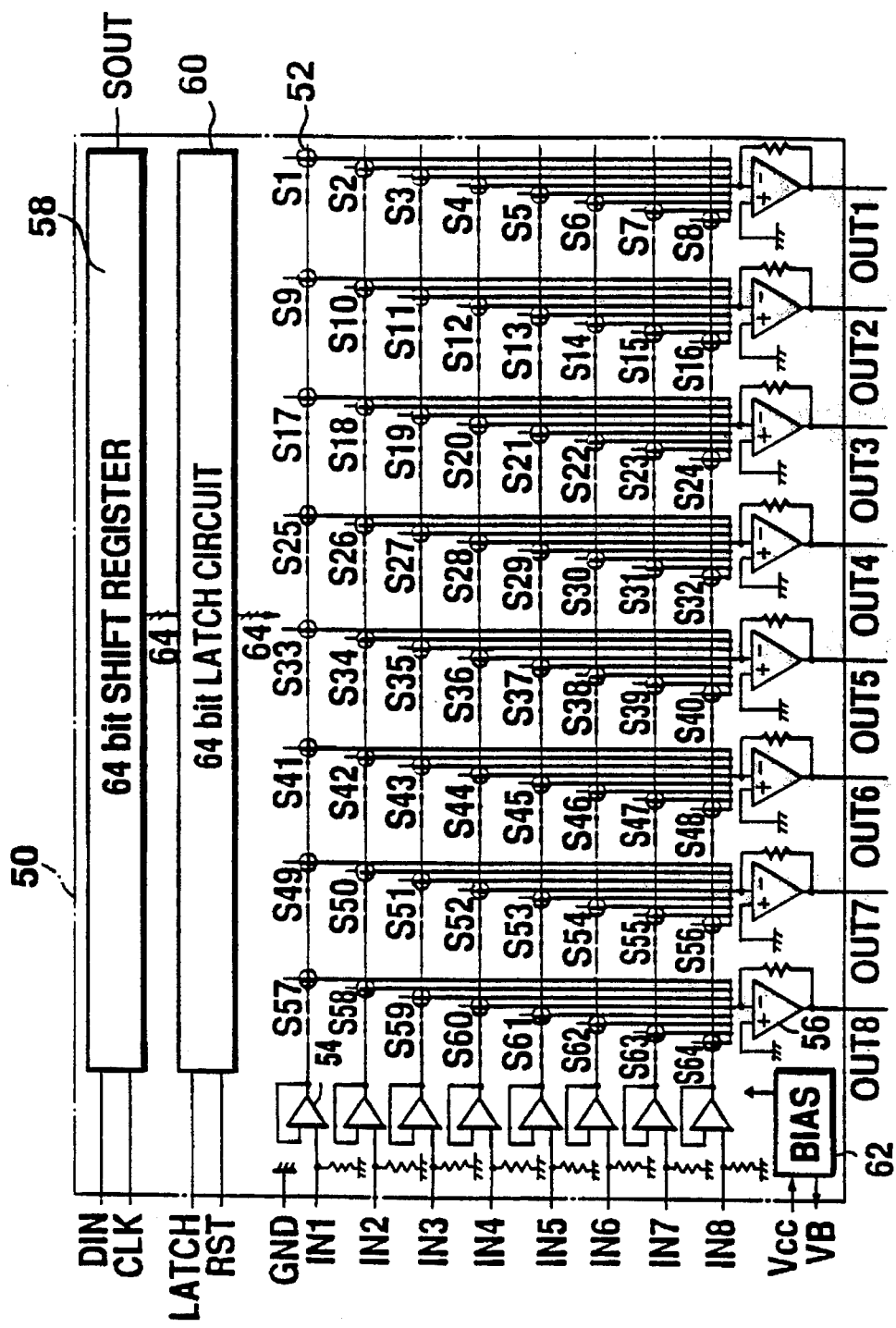
FIG. 6 is a block diagram showing a configuration of a cross point mixer in accordance with an embodiment of the present invention.

FIG. 6 diagrammatically illustrates a configuration of a preferred embodiment of the present invention. In this figure, cross point mixer 50 which constitutes an integrated circuit is shown. This embodiment comprises sixty four (8× 8=64) switches 52 ($S_1$ to $S_{64}$) which are arranged in a matrix.

This embodiment includes eight input terminals IN1 to IN8 as well as eight output terminals OUT1 to OUT8. An input buffer 54 is provided on each of the input terminals IN1 to IN8 while an operational amplifier 56 with 8 inputs is provided on each of the output terminals OUT1 to OUT8. Accordingly, a signal which has been input into any one of the input terminals IN1 to IN8 enters through the corresponding input buffer 54 into the corresponding eight switches 52, and then arrives at any one (or ones) of the operational amplifiers 56 by way of the switch (or switches) 52 being presently on among the eight. The operational amplifiers 56 including associated resistors perform mixing of the input signals for the output through the corresponding output terminals OUT1 to OUT8.

This embodiment further includes a 64-bit shift register 58 and a 64-bit latch circuit 60 acting in cooperation as a means for controlling the opening and closing of the switches 52. The shift register 58 receives input serial data DIN in response to a clock CLK for the conversion into parallel data, and transmits them to the latch circuit 60. The latch circuit 60 latches them in compliance with a latch signal LATCH. A reset signal RST aims to reset the latch circuit 60. The parallel data to be latched into the latch circuit 60 serve as control data for controlling the make and break of the sixty four switches, due to which the shift register 58 and the latch circuit 60 employ a 64-bit configuration. It will be appreciated that the present invention is not limited to this control system, but instead may use, for example, an addressing system as shown in FIG. 1. Furthermore, a terminal SOUT of the shift register 58 is a serial output terminal. The terminal SOUT could be used, for example, in the case where the cross point mixers 50 of this embodiment are cascaded laterally in the figure, for example, in the case of an 8×16 configuration.

Additionally, this embodiment comprises a power source 62 driven by VCC and which is for the supply of a bias voltage VB to the elements in the integrated circuit. The bias voltage VB is impressed on the signal transmitted to the input buffers 54 and is also supplied to an external circuit.

The switches 52 have two possible configurations as shown in FIGS. 7A and 7B.

FIG. 7A diagrammatically illustrates the simplest of the two possible switch configurations. In this configuration, an analog switch 64 and a resistor 66 are provided for connection. In such configuration, the analog switch 64 is opened or closed in response to the content of the latch circuit 60 (control signal), and when closed the signal from the corresponding input buffer 54 is to be output for the corresponding operational amplifier 56.

FIG. 7b diagrammatically illustrates a differential switch configuration comprising a current mirror circuit 68, differential transistor pairs 70 and 72, constant-current sources 74 and 76 which are connected to the differential transistors pairs 70 and 72, respectively, an output transistor 78, and a constant-current source 80 which constitutes an output circuit in cooperation with the output transistor 78. The current mirror circuit 68 is shared by the differential transistor pairs 70 and 72. One of the transistors making up the differential transistor pair 70 and one of the transistors constituting the differential transistor pair 72 are both connected at their bases to the output circuit. The transistor making up the other half of the differential transistor pair 70 has a base for receiving signals from the input buffers 54, while the transistor on making up the other half of the differential transistor pair 72 has a base which is supplied with the bias voltage VB.

The constant-current source 74 is allowed to be activated only in the case where a control signal presents a value representing "closed". The constant-current source 76 is not permitted to be activated during the operation of the constant-current source 74, but is allowed to work when deenergized. Therefore, when the constant-current source 74 is in operation, a only differential amplifier including the differential transistor pair 70 is energized, whereas the differential amplifier containing the differential transistor pair 72 does not work. At that time, the signal from the input buffer 54 is amplified by the differential amplifier including the differential transistor pair 70, and is then output through the output circuit to the corresponding operational amplifier 56.

According to this embodiment in this manner, the signals which have been input through the plurality of input terminals IN1 to IN8 can be mixed. This may arise from the directionality conferred on the signal transmission path by virtue of the operational amplifier 56, thereby preventing the occurrence of round-back crosstalk. Moreover, since the input buffer 54 also has directionality, simultaneous input of a plurality of signals into a single input terminal enables mixing to be performed by the associated resistors of input buffer 54. As shown in FIG. 8, for example, if two kinds of signals are input to the input terminal IN1, at IN1a and IN1b, the corresponding input buffer 54 outputs a signal obtained by mixing the two kinds of signals, thus effectively utilizing the input terminals IN1 to IN8.

More advantageously, the matrix arrangement of the switches 52 reduces and simplifies the signal paths to be required. As a result, the number of components is reduced compared with the configuration shown in FIG. 5, for example, which contributes to the improvement of the reliability and reduction in the circuit space. In addition, the control data DIN are subjected to a serial to parallel conversion by means of the shift register 58 and the latch circuit 60 for the control of make and break of the switch 52, which results in a reduction in the number of control inputs with respect to the cross point mixer 50, and accordingly a reduction in the number of terminals. Furthermore, because the control data DIN enables the switches 52 to be freely set, the design change of software of the CPU for supplying the control data DIN enables the signal transmission path to be freely set, which ensures prompt and simple dealing with the specification change. Besides, application equipment such as a telephone set can be reduced in size due to the integration of the mixer 50. Moreover, by virtue of the use of the power circuit 62, the bias voltage VB may be output as a reference voltage to the front and rear circuit elements (such as operational amplifiers), thereby eliminating the necessity of coupling capacitors to be provided onto the input terminals IN1 to IN8 and the output terminals OUT1 to OUT8. These effects may be particularly prominent in the telephone set including a multiplicity of branches.

Figure 9:
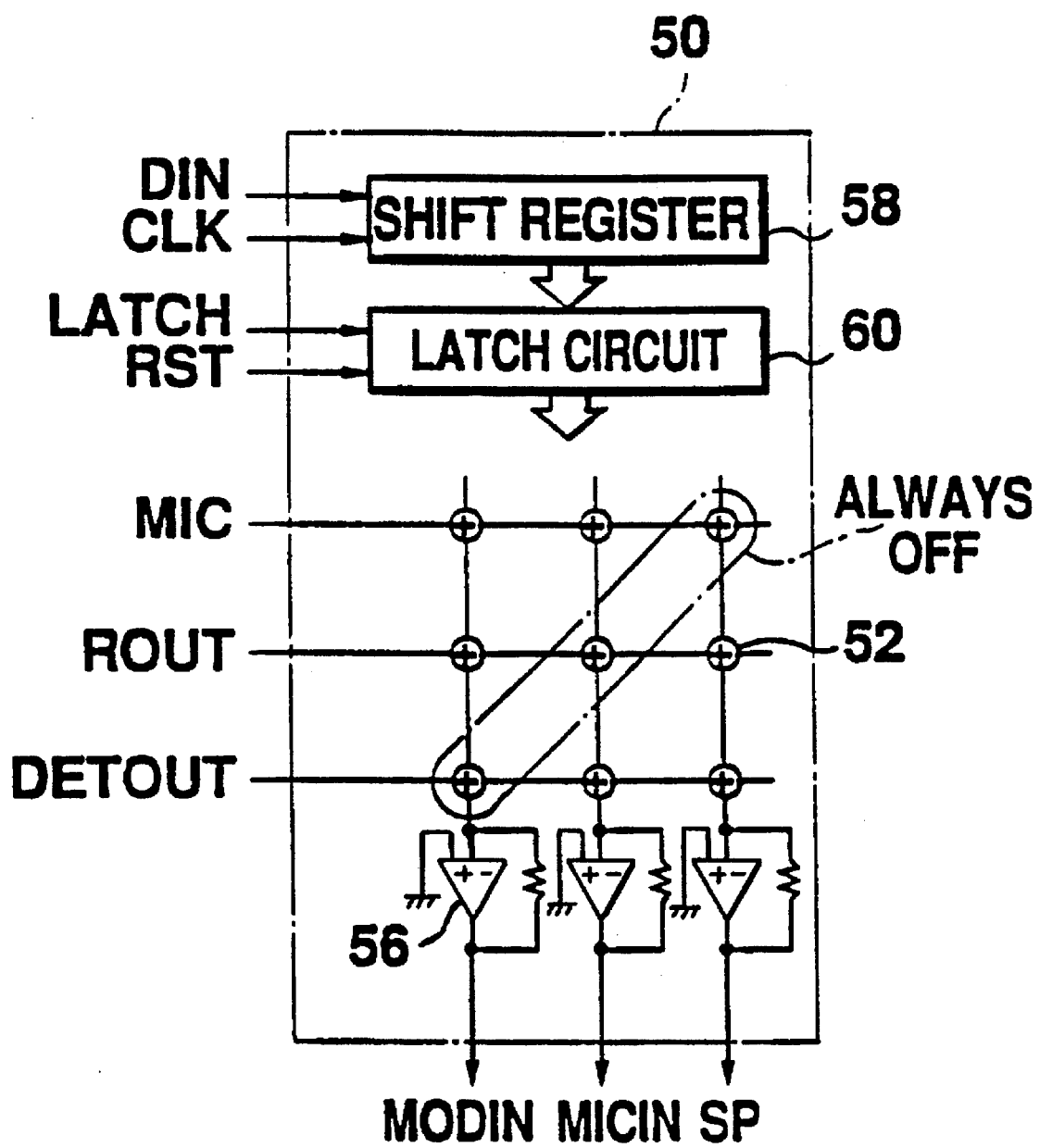
FIG. 9 is a block diagram showing an exemplary configuration in which 3×3 embodiment is applied to the cordless telephone set with three-party communication function.
Figure 10:
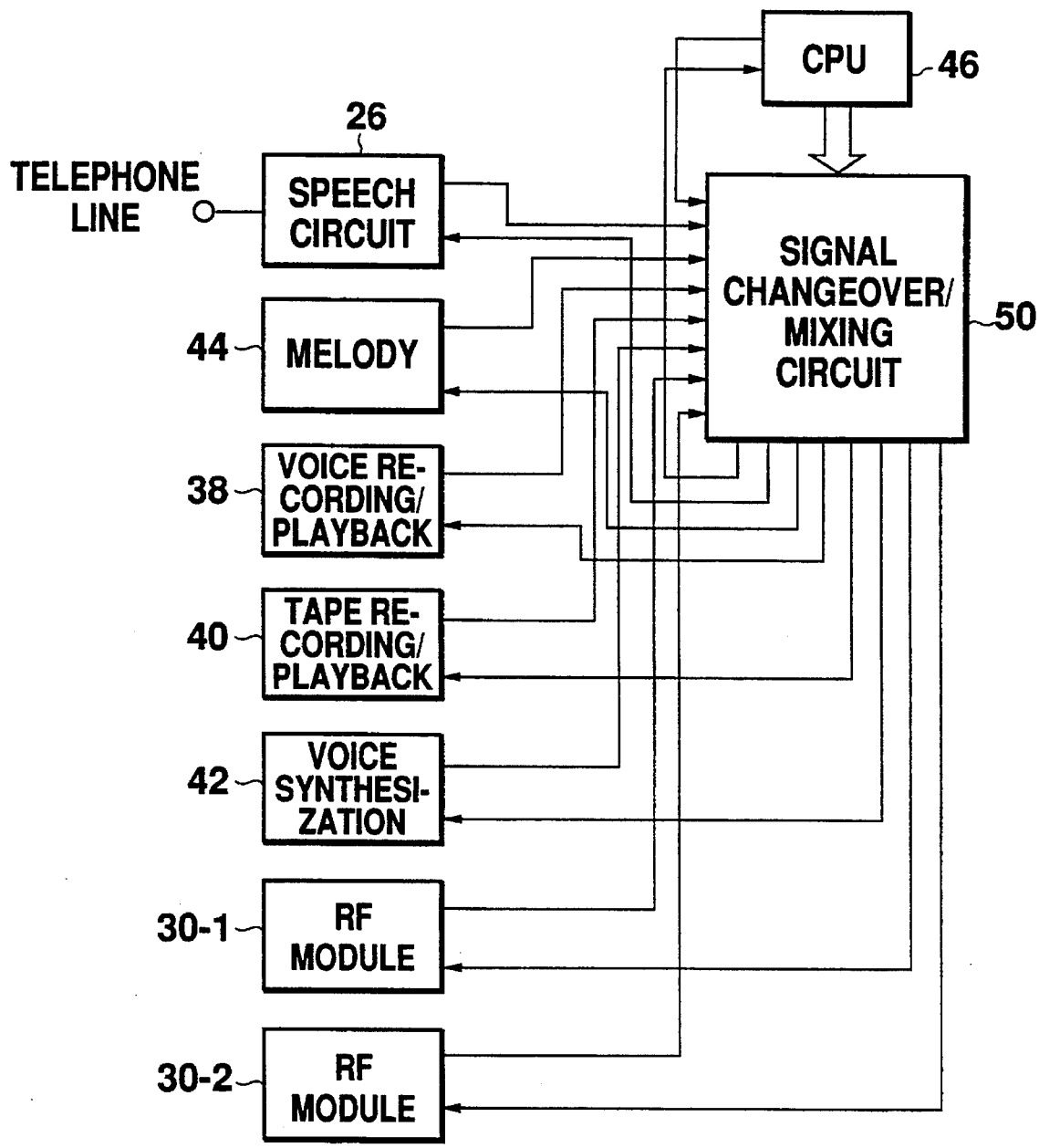
FIG. 10 is a block diagram showing an exemplary configuration in which 8×8 embodiment is applied to the cordless answering telephone set.
Figure 11:
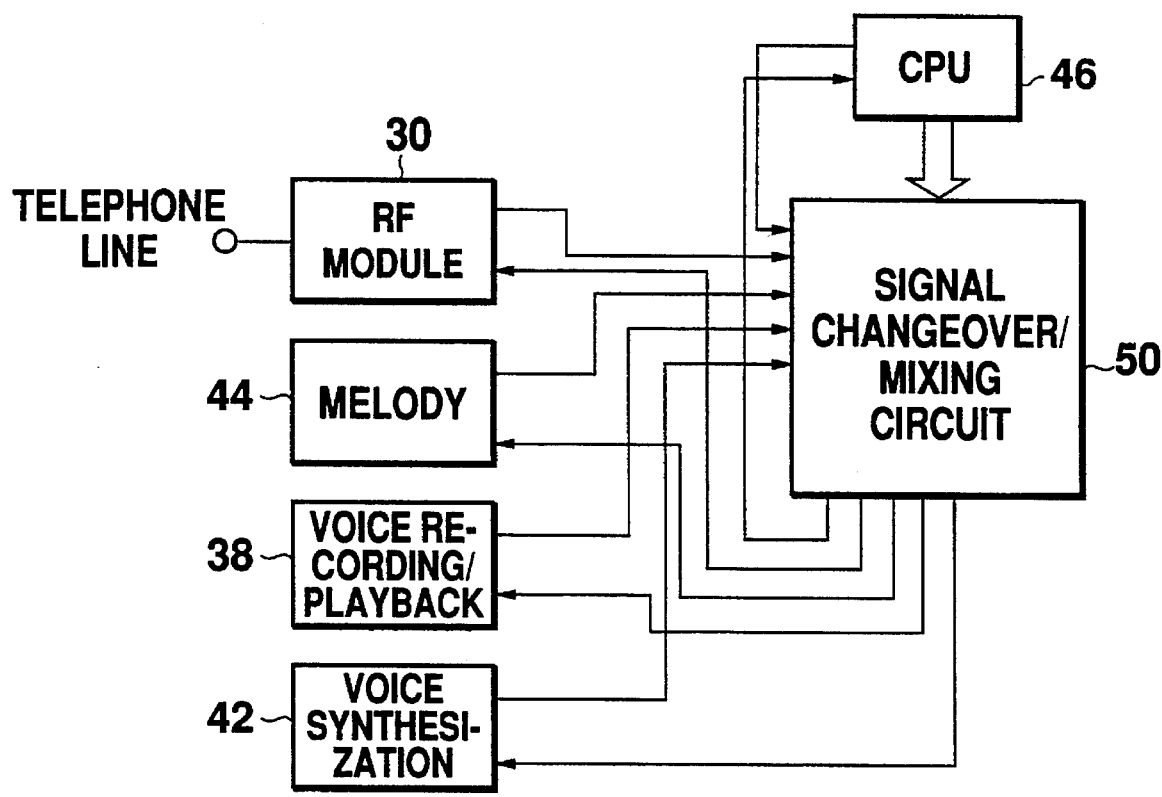
FIG. 11 is a block diagram showing an exemplary configuration in which 5×5 embodiment is applied to a branch of the cordless telephone set.

In the case of application to telephone sets, the cross point mixer 50 of the present embodiment makes it possible to realize functions such as a three-party communication, and communication between branches by use of a small number of components. FIGS. 9 to 11 illustrate applicative configurations of the cross point mixer 50 of this embodiment.

Referring first to FIG. 9, there is shown an example realizing a three-party communication function. The cross point mixer 50 diagrammatically illustrated in the figure comprises nine (3×3=9) switches 52. Three input terminals are assigned to a main set speaker's voice MIC, a telephone voice ROUT and a detection output DETOUT of an RF module, respectively, while three output terminals are assigned to a modulation input MODIN of the RF module, a voice input MICIN to the telephone line, and a voice input SP to the main set speaker, respectively. Due to the lack of necessity of mixing at the input, no input buffer 54 is provided. The power circuit 62 is omitted in the figure for brevity. Corresponding to nine switches 52, the shift register 58 and the latch circuit 60 are 9 bits. Move specifically, control data DIN is supplied by a CPU of the telephone set (not shown) in such a manner that the switches 52 for connecting MIC with SP, ROUT with MICIN, and DETOUT with MODIN are always off because of there is no need to directly output MIC to SP, for example.

The thus configured cross point mixer 50 is loaded into the main set of a cordless telephone, and the control data DIN is used to control the connection among a speech circuit, a handset and the RF module, i.e. examples of predetermined circuits, thereby realizing the three-party communication among external telephone's user, a main set's user and a branch's user with a simple configuration.

Referring next to FIG. 10, there is shown an applicative example in which this embodiment is loaded into the main set of a cordless answering phone. This application includes the cross point mixer 50 of this embodiment in lieu of a mixing circuit network shown in FIG. 5. The control inputs such as DIN are supplied from a CPU 46. According to this configuration, a phone call between the branches (a communication by way of the connection between the RF modules 30-1 and 30-2), for example, can be simply realized.

Referring finally to FIG. 11, there is shown an applicative example in which this embodiment is loaded into the branch of the cordless answering phone. This application includes a branch loaded with 5×5 cross point mixer 50 which is intended to effect the connection among the CPU 46, the RF module 30, a melody transmitting circuit 44, a voice recording/playback circuit 38 and a voice synthesization circuit 42. The control inputs such as DIN are supplied from the CPU 46. This configuration ensures, for example, a voice message mixing function on the branch side.

As described hereinabove, the cross point mixer of the present invention has an n×m matrix switch configuration, and hence the signal transmission path is reduced and simplified. The mixing on the output side eliminates the possibility of the round-back crosstalk and ensures preferable applications to the telephone set and other equipment.

Furthermore, according to the present invention, the switches are opened and closed by way of the control means, and hence only the software of the CPU has to be altered in order to change the setting of the circuit, thereby facilitating dealing with the change in specifications and enhancing the design freedom.

Moreover, according to the present invention, the control data undergo a serial to parallel conversion for the make and break of the switch, and hence the number of input terminals leading to the control means is less than the number of switches, which results in a reduction in the number of control wirings and control terminals, thus realizing an improved reliability, a saved space, and a reduced production cost.

Additionally, according to the present invention, at least one of the connections between the main set and the optional equipment, between the speech circuit and the other circuits, between the RF circuit and the other circuits are controlled by the cross point mixer of the present invention, and hence, for example, a three-party communication, a phone call between branches, a mixing voice output function between a synthesized voice and a line wire voice can be realized by a simple circuit configuration.

What is claimed is:

1. A cross point mixer comprising:

a plurality of cross point switches arranged in a matrix having n rows and m columns where n and m are natural numbers having a value of two or greater;

n input terminals, each of said input terminals connected to one of said rows for receiving signals;

m output terminals, each of said output terminals connected to one of said columns for outputting said signals, each of said switches when being on forming a signal transmission path connecting one of said input terminals with a corresponding one of said output terminals;

mixing means provided between said columns and said output terminals for receiving and mixing signals from said columns of said switches for output to said corresponding one of said output terminals; and control means for selectively setting or breaking a connection between said n input terminals and said mixing means by selectively opening and closing said switches in compliance with serially input control data, said control means further including: 1) means for executing a parallel conversion of said serially input control data; and 2) means for serially outputting said serially input control data, said serially output control data for use with at least one additional cross point mixer.

2. A cross point mixer according to claim 1, wherein said control means includes means for latching said control data subsequent to said parallel conversion.

3. A cross point mixer according to claim 1, wherein said control means includes means for converting said control data into binary data.

4. A cross point mixer according to claim 3, wherein said control means includes means for latching said control data subsequent to said control data being converted into said binary data.

5. A cross point mixer according to claim 1, wherein said mixing means comprises at least one operational amplifier.

6. A cross point mixer according to claim 1, wherein each of said cross point switches comprises:

an analog switch connected to a resistor.

7. A cross point mixer according to claim 1, further comprising means for supplying control signals to said switches, each of said switches including an amplifier receiving, amplifying and outputting the signals from a corresponding one of said input terminals; and means for turning off said amplifier in response to control signals.

8. A cross point mixer according to claim 1, further comprising second mixing means connected to an input of each of said input terminals, said second mixing means mixing a plurality of signals and supplying the mixed signals to the corresponding input terminal.

9. A cross point mixer according to claim 1, wherein said n input terminals are connected to output terminals of a plurality of predetermined circuits, said output terminals of said cross point switches are connected to input terminals of said predetermined circuits, and switches connected to an input and an output of a corresponding one of the predetermined circuits are permanently off.

10. The cross point mixer of claim 1, wherein said plurality of switches connects a plurality of said n input terminals to a plurality of said m output terminals simultaneously.

11. The cross point mixer of claim 1, wherein said cross point mixer is incorporated in an integrated circuit.

12. A cross point mixer according to claim 1, wherein one of the plurality of cross point switches is provided at each of a plurality of crosspoints which make up the matrix.

13. A telephone set comprising:

a plurality of circuits for transmitting and receiving signals to and from each other, and a cross point mixer for setting and breaking connections among said plurality of circuits, said cross point mixer including:

a plurality of cross point switches arranged in a matrix having n rows and m columns;

n input terminals, each of said input terminals connected to one of said rows for receiving signals;

a plurality of m output terminals, each of said output terminals connected to one of said columns for outputting signals, each of said switches when being on forming a signal transmission path connecting one of said input terminals with a corresponding one of said output terminals;

mixing means provided between said columns and said output terminals for receiving and mixing signals from said columns of said switches for output to said corresponding one of said output terminals; and control means for selectively setting or breaking a connection between said n input terminals and said mixing means by selectively opening and closing said switches in compliance with serially input control data, said control means further including: 1) means for executing a parallel conversion of said serially input control data; and 2) means for serially outputting said serially input control data, said serially output control data for use with at least one additional cross point mixer.

14. A telephone set according to claim 13, wherein said plurality of circuits include optional equipment connected through a wire or wirelessly to said cross point mixer.

15. A telephone set according to claim 13, wherein said plurality of circuits include:

a speech circuit connected to a telephone line, and a plurality of transmitting and receiving circuits for transmitting and receiving said signals to and from said speech circuit by way of said cross point mixer.

16. A telephone set according to claim 13, further comprising a main set which transmits radio signals, wherein said plurality of circuits includes:

an RF circuit for transmitting and receiving said radio signals to and from said main set; and a plurality of transmitting and receiving circuits for transmitting and receiving signals to and from said RF circuit.

17. A telephone set according to claim 13, wherein said plurality of circuits include at least one member selected from the group consisting of:

a speech circuit connected to a telephone line;

means for converting a voice into an electrical signal and inputting said electrical signal;

means for converting said electrical signal into said voice and outputting said voice;

means for modulating said electrical signal and producing a radio signal;

means for modulating said radio signal representing said voice and producing said electrical signal;

means for generating a melody signal;

means for recording and replaying said electrical signal;

means for recording said voice on a tape recorder and replaying said voice; and means for synthesizing said electrical signal.

18. A cross point mixer according to claim 13, wherein one of the plurality of cross point switches is provided at each of a plurality of crosspoints which make up the matrix.

* * * * *